(12) United States Patent
Grauman et al.

(10) Patent No.: US 6,607,846 B1
(45) Date of Patent: Aug. 19, 2003

(54) TITANIUM ARTICLE HAVING IMPROVED CORROSION RESISTANCE

(75) Inventors: James S. Grauman, Henderson, NV (US); James G. Miller, Henderson, NV (US); Roy E. Adams, Henderson, NV (US)

(73) Assignee: Titanium Metals Corporation, Henderson, NV (US)

( * ) Notice: Subject to any disclaimer, the term of this patent is extended or adjusted under 35 U.S.C. 154(b) by 0 days.

(21) Appl. No.: 10/253,437

(22) Filed: Sep. 25, 2002

(51) Int. Cl.⁷ .............................................. B32B 15/01
(52) U.S. Cl. ...................... 428/660; 428/670; 428/934; 428/935; 428/938
(58) Field of Search .............................. 428/660, 670, 428/934, 935, 938

(56) References Cited

U.S. PATENT DOCUMENTS

| | | |
|---|---|---|
| 3,063,835 A | 11/1962 | Stern |
| 4,238,551 A | 12/1980 | Lal et al. |

OTHER PUBLICATIONS

*Journal of the Electrochemical Society*, "The Electrochemical Behavior and Passivity of Titanium", Apr. 3, 1959, Milton Stern et al., Union Carbide Metals Company, pp. 1–9, Figs. 1–6.

*Primary Examiner*—Robert R. Koehler
(74) *Attorney, Agent, or Firm*—Finnegan, Henderson, Farabow, Garrett & Dunner LLP

(57) ABSTRACT

A titanium article having improved corrosion resistance resulting from an appliqué of a platinum group metal or alloy thereof attached to a minor surface portion of the article.

20 Claims, No Drawings

TITANIUM ARTICLE HAVING IMPROVED CORROSION RESISTANCE

BACKGROUND OF THE INVENTION

1. Field of the Invention

This invention relates to a titanium article wherein improved corrosion resistance is achieved by the use of an appliqué of a platinum group metal or alloy thereof directly attached to a minor surface portion thereof.

2. Description of the Prior Art

Titanium, being a reactive metal, relies on the formation and stability of a surface oxide film for corrosion resistance. Under stable conditions, titanium can demonstrate remarkable corrosion resistant behavior. The reverse is also true, however, in that when the film is destabilized, extremely high corrosion rates may result. These conditions of instability are generally at the two extremes of the pH scale. Strongly acidic or alkaline solutions can create instability in the titanium oxide film.

Typically, in accordance with prior art practice, when using titanium in an area of uncertain oxide film stability, alloying elements have been added to the titanium to enhance the oxide film stability, thus increasing its effective usefulness at the pH extremes. This practice has proven most effective for the acid end of the pH scale. Several alloying elements have shown success in this regard, such as molybdenum, nickel, tantalum, niobium and precious metals. Of this group, the platinum group metals (PGM) offer far and away the most effective protection against corrosion. The platinum group metals are platinum, palladium, ruthenium, rhodium, iridium and osmium.

Stern et al. demonstrated this in 1959 in a paper titled "The Influence of Nobel Metal Alloy Additions on the Electrochemical and Corrosion Behavior of Titanium". They found that as little as 0.15% Pd or Pt alloying additions greatly enhanced the stability of the oxide film on titanium, and thus the corrosion resistance, in hot reducing acid medium. Consequently, for many years the ASTM grade 7 titanium (Ti-0.15Pd) has been the standard material for use in severe corrosive conditions where unalloyed titanium is subject to corrosion. More recently, ASTM grade 16 (Ti-0.05Pd) and grade 26 (Ti-0.1Ru) have been used as direct replacements for grade 7 because they are more economical and provide a level of corrosion resistance close to that of grade 7. Thus, they tend to be considered equivalent in less drastic corrosion applications.

The mechanism of protection afforded by platinum group metal additions to titanium is one of increased cathodic depolarization. The platinum group metals afford a much lower hydrogen overvoltage in acidic media, thereby increasing the kinetics of the cathodic portion of the electrochemical reaction. This increased kinetics translates to a change in the slope of the cathodic half reaction, leading to a more noble corrosion potential for the titanium. The active/passive anodic behavior of titanium allows for a small shift in corrosion potential (polarization) to effect a large change in the corrosion rate.

Prior work on the polarization behavior of titanium was performed by Stern and Wissenberg in 1959. In this work, titanium was galvanically coupled to other metals to observe the effects on the corrosion rate of titanium in sulfuric acid media. The researchers found that titanium coupled to platinum could exhibit a reduction in corrosion rate of up to 100 fold, as seen in the present invention. However, they were not directly attaching the platinum onto the titanium and thus did not realize the extraordinary benefits seen in the present invention. In order for Stern and Wissenberg to achieve a 100 fold reduction in corrosion, they found that the surface area of the platinum had to be 4 times the area of the titanium. Thus, their surface area ratio of Ti/PGM was ¼. In fact, at a 35/1 Ti/PGM surface area ratio, the authors saw no benefit from the platinum coupling whatsoever. This was clearly not advantageous in terms of cost and thus, it is presumed the researchers then pursued alloying as the means of enhanced environmental behavior, as disclosed in U.S. Pat. No. 3,063,835. In the present invention using a direct attachment method, the 100 fold corrosion rate reduction is observed at all Ti/PGM surface area ratios, even to ratios thousands of times larger than Stern and Wissenberg's.

Although the above-described prior art practices are effective for enhancing the corrosion resistance of titanium in severe corrosive conditions, alloying additions of precious metals and especially the platinum group metals are extremely expensive.

SUMMARY OF THE INVENTION

The invention of the instant application provides, in place of alloying, a relatively low cost and easy to apply practice for achieving improved corrosion resistance of titanium subjected to severe corrosive applications, and thus is advantageous in this regard when compared to the prior art practices discussed above.

In accordance with the invention, it has been determined that a simple direct application of a small amount of a platinum group metal (PGM) or alloy thereof onto the titanium surface can protect a large surface area of the titanium. The PGM or alloy thereof is not alloyed with the titanium but instead, plated, resistance welded, fusion welded, or vapor deposited to achieve direct attachment to a minor surface portion of a titanium article. In accordance with the invention, a titanium article having improved corrosion resistance comprises a titanium substrate having directly attached to a minor surface portion thereof, a patch or appliqué of a platinum group metal or alloy thereof present in an amount effective to produce an article that exhibits better corrosion resistance than the article without the patch or appliqué. The PGM appliqué is present in an area thereof less than 1% (excluding 0) of the article surface area to be protected. A ratio of the surface area of the article to the area of the appliqué of greater than 10 to 10000 or greater than 50 to 10000 may be used in accordance with the invention. Although any desired practice may be used to directly attach the patch or appliqué to the titanium substrate, preferred practices include plating, resistance welding, fusion welding, and vapor deposition. The preferred PGM is platinum and the preferred PGM alloy is an alloy including 1% Pd. or 1% Pt.

DESCRIPTION OF THE PREFERRED EMBODIMENTS AND SPECIFIC EXAMPLES

In experimental work leading to the invention, general corrosion testing was performed with varying surface area ratios with excellent results. The polarization effect (change in corrosion potential) was observed over a significant distance. As shown in Tables 1 and 2, the practice of the invention can be more effective than either grade 16 or grade 26 in boiling HCl at substrate to appliqué surface area ratios as great as 1000.

TABLE 1

Corrosion Rates in Hydrochloric Acid

| Test Material | Solution (@ boiling) | Area Ratio (Ti Gr2/ PGM) | Max. Distance from PGMA (in) | Corrosion Rate (mpy) |
|---|---|---|---|---|
| ASTM Grade 2 | 5% HCl | — | — | ~1000 |
| ASTM Grade 7 | 5% HCl | — | — | 4.7 |
| ASTM Grade 16 | 5% HCl | — | — | 5.4 |
| ASTM Grade 26 | 5% HCl | — | — | 12.2 |
| Grade 2 with Pt[1] | 5% HCl | 66/1 | 2 | 4.3 |
| Grade 2 with Pt[2] | 5% HCl | 55/1 | 2 | 4.8 |
| Grade 2 with Pt[2] | 5% HCl | 110/1 | 2 | 4.9 |
| Grade 2 with Pt[2] | 5% HCl | 220/1 | 2 | 5.4 |
| Grade 2 with Pt[2] | 5% HCl | 440/1 | 2 | 4.9 |
| Grade 2 with Pt[2] | 5% HCl | 440/1 | 4 | 5.2 |
| Grade 2 with Pt[1] | 5% HCl | 1000/1 | 4 | 4.3 |
| Grade 2 with Pd[2] | 5% HCl | 66/1 | 2 | 4.7 |
| Grade 2 with Rh[2] | 5% HCl | 66/1 | 2 | 5.6 |

Footnotes:
[1]PGM was plated onto surface.
[2]PGM was resistance welded onto surface as a sheet.

TABLE 2

Corrosion Rates for PGM Alloy Applique in Hydrochloric Acid

| Test Material | Solution (@ boiling) | Area Ratio (Ti Gr2/ PGM Alloy) | Corrosion Rate (mpy) |
|---|---|---|---|
| ASTM Grade 2 | 5% HCl | — | ~1000 |
| ASTM Grade 7 | 5% HCl | — | 4.7 |
| ASTM Grade 16 | 5% HCl | — | 5.4 |
| ASTM Grade 26 | 5% HCl | — | 12.2 |
| Grade 2 with Ti-1% Pt | 5% HCl | 125/1 | 5.8 |
| Grade 2 with Ti-1% Pt | 5% HCl | 250/1 | 6.9 |
| Grade 2 with Ti-1% Pt | 5% HCl | 500/1 | 1060 |
| Grade 2 with Ti-1% Pd | 5% HCl | 125/1 | 4.8 |
| Grade 2 with Ti-1% Pd | 5% HCl | 250/1 | 8.9 |
| Grade 2 with Ti-1% Pd | 5% HCl | 500/1 | 940 |

Likewise, the corrosion rates can be lowered in oxidizing acids as well. This is demonstrated in Table 3 in concentrated nitric acid. In this instance, the titanium with the Pt appliqué actually performed better than documented rates for grade 7.

TABLE 3

Corrosion Rates in Nitric Acid

| Test Material | Solution | Area Ratio | Corrosion Rate (mpy) | Comments |
|---|---|---|---|---|
| ASTM Grade 2 | 40% @ Boiling | — | 24.1 | 96 Hr. Exposure |
| ASTM Grade 7 | 40% @ Boiling | — | 25 | From data archive |
| ASTM Grade 12 | 40% @ Boiling | — | 15 | From data archive |
| Grade 2 with Pt | 40% @ Boiling | 66/1 | 6.7 | 96 Hr. Exposure |

It was also determined in crevice corrosion testing that the titanium metal within a crevice can be effectively protected by application of the PGM appliqué on the titanium substrate outside of the crevice. Once again, the results confirmed that the grade 2 titanium with a PGM appliqué could exhibit equivalent corrosion behavior as that of grade 7 titanium.

TABLE 4

Crevice Corrosion Results

| Test Material | Solution | Area Ratio | Max. Distance from PGMA (in.) | Severity of Crevice Corrosion |
|---|---|---|---|---|
| ASTM Grade 2 | 5% NaCl, pH 3 | — | — | Moderate Attack |
| ASTM Grade 7 | 5% NaCl, pH 3 | — | — | No Attack |
| ASTM Grade 12 | 5% NaCl, pH 3 | — | — | Minor Attack |
| Grade 2 with Pt | 5% NaCl, pH 3 | 120/1 | 3 | No Attack |
| Grade 2 with Pt | 5% NaCl, pH 3 | 120/1 | 5 | No Attack |
| ASTM Grade 2 | 5% NaCl, pH 1 | — | — | Severe Attack |
| ASTM Grade 7 | 5% NaCl, pH 1 | — | — | No Attack |
| ASTM Grade 12 | 5% NaCl, pH 1 | — | — | Moderate Attack |
| Grade 2 with Pt | 5% NaCl, pH 1 | 120/1 | 3 | No Attack |
| Grade 2 with Pt | 5% NaCl, pH 1 | 120/1 | 5 | No Attack |
| ASTM Grade 7 | 5% NaCl + 1000 ppm $Fe^{3+}$ pH 0.5 | — | — | No Attack |
| ASTM Grade 12 | 5% NaCl + 1000 ppm $Fe^{3+}$ pH 0.5 | — | — | Severe Attack |
| Grade 2 with Pt | 5% NaCl + 1000 ppm $Fe^{3+}$ pH 0.5 | 120/1 | 3 | No Attack |
| Grade 2 with Pt | 5% NaCl + 1000 ppm $Fe^{3+}$ pH 0.5 | 120/1 | 5 | No Attack |

The method of application of the PGM or the alloy thereof does not affect the performance as long as the patch or appliqué is directly attached to the titanium substrate. This effect was observed with different PGM metals, such as platinum, palladium and rhodium. The extent of protection does vary somewhat with different platinum group metals and alloys thereof, depending upon the corrosive media; however, in all cases significant corrosion resistance was achieved.

The strength of the polarization effect of the appliqué was tested by several means. Simultaneous tests in boiling acid utilizing various Ti/PGM area ratios were performed. In addition, samples of the same area ratio but with varying distances between the farthest edge of the titanium test coupon and the appliqué were also studied. As an example, in one instance, the ratio was set at 250/1; however, one set of coupons were twice the length of a second set. Thus, the distance over which the PGM appliqué was forced to protect (polarize) was doubled. This distance difference had no effect on the protective polarization of the test coupon. In both instances, the appliqué was applied to only one side of the test coupon; however, the polarization effect did not suffer from one side of the specimen to the other.

As may be seen from the experimental work above described in hot reducing acid environments, the titanium sample with the appliqué can exhibit the same corrosion behavior as ASTM grade 7 (Ti-0.15Pd).

The cost benefits of the invention over conventional practices are huge. Specifically, at only a 500/1 surface area ratio, the incremental cost of the PGM appliqué over the base cost of the titanium is about $0.50/lb at a titanium thickness of 0.125 in and drops to $0.25/lb at a thickness of 0.25 in. By contrast, the incremental cost of grade 7, which is titanium alloyed with 0.15% palladium, over grade 2 commercially pure titanium, is on the order of $15/lb. This will not change with metal thickness since it is an alloying addition, so at 0.125 in gauge, the appliqué offers roughly a 96% cost reduction while at 0.25 in titanium metal thickness, the cost reduction is more on the order of 98%.

Similarly, using a Ti-1% Pd alloy as the appliqué, at a 125/1 ratio the incremental costs would be about $0.13/lb. at a thickness of 0.125 in. and only $0.07/lb. at a 0.25 in. thickness.

The invention also provides significant advantages with respect to delivery and availability of the corrosion resistant material. Specifically, companies do not normally inventory titanium alloys containing a PGM due to the cost of inventorying these high cost metals. Thus, these grades tend to be less available than standard grades of titanium that do not contain an alloyed PGM. Consequently, delivery times tend to be longer since manufacturers are generally required to work these melts into their melting schedule as time permits. Whereas, normal grades of titanium are in production on a routine basis and additional melts may be added without time delays.

The invention offers great versatility in that it may be used by the manufacturer, the fabricator or at a facility of an end user. Since only direct attachment of the patch or appliqué is required, specialized equipment or specialized skills are not necessary.

The invention may be specifically targeted to areas of process equipment that will be used in environments more susceptible to corrosion. This could further reduce the overall cost of utilizing the invention. In this regard, the practice of the invention would allow for in-situ repair of existing titanium equipment that begins to suffer from corrosion.

The practice of the invention allows for selection of the most appropriate PGM or PGM alloy appliqué for a specific environment in order to maximize corrosion performance and reduce cost. This is not the case with PGM alloyed grades of titanium where the PGM is fixed in the alloyed article.

The term "titanium" as used herein in the specification and claims refers to elemental titanium, commercially pure titanium and titanium base alloys. The term "platinum group metals" (PGM) as used herein in the specification and claims refers to platinum (Pt), palladium (Pd), ruthenium (Ru), rhodium (Rh), iridium (Ir), and osmium (Os). The term platinum group metal (PGM) alloy as used herein in the specification and claims refers to the use of an alloy whose minor constituent consists of a PGM or an alloy thereof comprised of 2 or more platinum group metals. The term "corrosion" as used herein in the specification and claims is defined as the chemical or electrochemical reaction between a material, usually a metal, and its environment that produces a deterioration of the material and its properties.

What is claimed is:

1. A titanium article having improved corrosion resistance, comprising a titanium substrate having directly attached to a minor surface portion thereof an appliqué of a platinum group metal or platinum group metal alloy wherein the appliqué of the platinum group metal is present in an area less than 1% (excluding 0) of the surface area to be protected or any minor surface area for the platinum group metal alloy, whereby said article exhibits better corrosion resistance than said article without said appliqué.

2. The titanium article of claim 1, wherein said appliqué is present in an article surface area to appliqué ratio of 10 to 10000.

3. The titanium article of claim 1, wherein said appliqué is present in an article surface area to appliqué ratio of 50 to 10000.

4. The titanium article of claim 1, or claim 2, or claim 3, wherein said platinum group metal is platinum.

5. The titanium article of claim 1, or claim 2, or claim 3, wherein said platinum group metal alloy includes 1% Pd or 1% Pt.

6. A titanium article having improved corrosion resistance, comprising a titanium substrate having directly attached to a minor surface portion thereof by welding an appliqué of a platinum group metal or platinum group metal alloy, wherein the appliqué is of the platinum group metal is present in an area less than 1% (excluding 0) of the surface area to be protected or any minor surface area for the platinum group metal alloy, whereby said article exhibits better corrosion resistance than said article without said appliqué.

7. The titanium article of claim 6, wherein said appliqué is present in an article surface area to appliqué ratio of greater than 10 to 10000.

8. The titanium article of claim 6, wherein said appliqué is present in an article surface area to appliqué ratio of greater than 50 to 10000.

9. The titanium article of claim 6, or claim 7, or claim 8, wherein said platinum group metal is platinum.

10. The titanium article of claim 6, or claim 7, or claim 8, wherein said platinum group metal alloy includes 1% Pd or 1% Pt.

11. A titanium article having improved corrosion resistance, comprising a titanium substrate having directly attached to a minor surface portion thereof by plating an appliqué of a platinum group metal or platinum group metal alloy wherein the appliqué of the platinum group metal is present in an area less than 1% (excluding 0) of the surface area to be protected or any minor surface area for the platinum group metal alloy, whereby said article exhibits better corrosion resistance than said article without said appliqué.

12. The titanium article of claim 11, wherein said appliqué is present in an article surface area to appliqué ratio of greater than 10 to 10000.

13. The titanium article of claim 11, wherein said appliqué is present in an article surface area to appliqué ratio of greater than 50 to 10000.

14. The titanium article of claim 11, or claim 12 or claim 13, wherein said platinum group metal is platinum.

15. The titanium article of claim 11, or claim 12, or claim 13, wherein said platinum group metal alloy includes 1% Pd or 1% Pt.

16. A titanium article having improved corrosion resistance, comprising a titanium substrate having directly attached to a minor surface portion thereof by vapor deposition an appliqué of a platinum group metal or platinum group metal alloy, wherein the appliqué of the platinum group metal is present in an area less than 1% (excluding 0) of the surface area to be protected or any minor surface area for the platinum group metal alloy, whereby said article exhibits better corrosion resistance than said article without said appliqué.

17. The titanium article of claim 16, wherein said appliqué is present in an article surface area to appliqué ratio of greater than 10 to 10000.

18. The titanium article of claim 16, wherein said appliqué is present in an article surface area to appliqué ratio of greater than 50 to 10000.

19. The titanium article of claim 16, or claim 17, or claim 18, wherein said platinum group metal is platinum.

20. The titanium article of claim 16, or claim 17, or claim 18, wherein said platinum group metal alloy includes 1% Pd or 1% Pt.

* * * * *